UNITED STATES PATENT OFFICE.

JOHAN ROBERT KÖHLER, OF STOCKHOLM, SWEDEN.

PROCESS OF MAKING BETULIN SUITABLE FOR THE PRODUCTION OF COATING COMPOSITIONS THEREOF.

1,016,162.  Specification of Letters Patent.  Patented Jan. 30, 1912.

No Drawing.  Application filed June 16, 1911. Serial No. 633,582.

*To all whom it may concern:*

Be it known that I, JOHAN ROBERT KÖHLER, a citizen of the Kingdom of Sweden, residing at Stockholm, Sweden, have invented a new and useful Improved Process of Making Betulin Suitable for the Production of Coating Compositions Thereof, of which the following is a specification.

In the manufacture of coating compositions of betulin as a substitute for usual lac-varnishes and the like certain difficulties arise which are due partly to the small solubility of the betulin in cold solvents, partly to the tendency of the betulin to crystallize when the solvent is removed.

Pure betulin produced in the usual manner is dissolved only in little degree in cold solvents such as alcohol, while the solubility is increased essentially in heated solvents, but when the latter are cooled the excess of the dissolved betulin again crystallizes, and on account thereof it is not possible in this way to produce coating compositions containing betulin as an ingredient.

If the betulin be molten it becomes again crystalline when growing solid by cooling. The melting point of such betulin as well as the solubility conditions are the same as those of betulin which has not been molten. First by heating the betulin considerably above its melting point during a sufficiently long time it is possible to increase its solubility in such a degree that it can be used for the present purpose. Betulin treated in such a manner does not crystallize from a concentrated heated solution thereof when the latter is cooled, and the solution has properties which make it quite equal to a good lac-varnish, inasmuch as the betulin when the solvent is dried or removed becomes solid and forms a mass of glassy structure. The heating of the betulin that is used according to the present invention is varied according as the betulin is heated alone or in a solution and also according to the length of the time of heating. If the betulin is heated alone, the temperature must be increased considerably above the melting point (about 50–120° C. above the melting point), and, inasmuch as the betulin rapidly assumes a dark color when heated to such a high temperature in air on account of partial decomposition, the heating should suitably be made either in vacuum or in an indifferent gas atmosphere. The time of heating may be varied from one to twenty hours depending on the temperature used, a higher temperature rendering it possible within certain limits to use a shorter time of heating. Any exact limits for temperature and time of heating may, however, not be given, inasmuch as such limits depend on the quantity treated, the degree of purity of the betulin, the stirring of the molten mass, the pressure used and so on. Generally the temperature and the time of heating therefore must be determined empirically in each special case. The purpose of the heating is reached when the mass is rather easily dissolved in hot turpentine oil and when from a concentrated solution thereof no precipitation takes place when the solution is cooled. The melting point of the mass is generally about 130–140° C. and of the same may be produced cold solutions containing up to 50% of betulin or more, while usual crystallized or only molten betulin is dissolved hardly to one percentage in cold solvents.

How the betulin during the heating according to the present invention is changed cannot yet be decided. Probably an inner reconstruction of the betulin molecule takes place as is the case with the natural resin acids, the sapin acids, which when heated are transformed into isomeric colophon acids having quite other properties than the original acids as to their relation to polarized light, their solubility, melting point and so on. The melting point generally sinks the more the higher temperature is that is used and the longer the time is during which the betulin is heated. If the heating is made during a too long time or at a too high temperature the betulin can be transformed into a half solid, sticky, non-drying mass.

Experiment 1: Betulin was heated in a vacuum of 20 to 30 mm. mercury pressure with and without admitting a current of an indifferent gas, for instance carbonic acid ($CO_2$), for the purpose of stirring. Good results were obtained by using a temperature of 350 to 370° C. and a time of heating of about four hours. A lower temperature (300 to 320° C.) and a longer time generally gave the same result. The melting point of the final product was about 140° C. Good lac-varnishes could be manufactured of the same while using well known solvents, such as linseed oil, turpentine oil, acetone and so on.

Experiment 2: Betulin was heated at usual pressure in an atmosphere of $CO_2$. Good results were reached by using a temperature of 350 to 370° C. and a heating during about four hours. The product obtained was similar to that described under Experiment 1 but was of a somewhat darker color.

Experiment 3: Betulin was heated under pressure in an atmosphere of $CO_2$. A soluble product with a melting point of 130 to 135° C. was obtained by using a temperature of 360 to 370° C. and a time of heating of about three hours. At higher temperature (for instance 400° C.) decomposition took place and the product became darkbrown. Also a too long time of heating proved itself to be unfavorable. Thus the betulin heated during five hours to 365° C. was transformed into a yellow-brown, half-solid, non-drying mass. Heating to a lower temperature than 360° C. during a longer time resulted in an amorphous glassy mass, which was difficult to dissolve and therefore could not be used for the present purpose. Thus at a temperature of 340° C. and a time of heating of fifteen hours an unsoluble product was obtained. The latter had a melting point of 232° C.

Instead of heating the betulin alone, as described above, one may accomplish the transformation thereof by taking it up successively into a hot solvent, for instance linseed oil, or turpentine oil, or a mixture of these oils under pressure.

Betulin in its natural state is difficult to dissolve in linseed or turpentine oil on account whereof it precipitates in a crystalline or amorphous state from hot solutions of usual betulin in linseed or turpentine oil when the solutions are cooled. If however the betulin is dissolved in the solvent by heating the latter under pressure to temperatures above the melting point of the betulin, a lac will be obtained which may contain 50% of betulin or more, and the betulin does not precipitate from the solution when the latter is cooled. Clear solutions of crystallized betulin in linseed oil (or turpentine oil) have been obtained at a temperature of 255–280° C. and a time varying between 30 minutes and 5 hours. At the shorter time solutions containing about 20% of betulin were obtained, while at the longer time the solutions contained about 50% of betulin. Betulin extracted from the last mentioned solutions had a melting point of about 190–195° C.

For making betulin suitable as an ingredient of coating compositions one may use both of the above described methods in the following manner. The betulin is first molten and heated alone above its melting point but at a lower temperature or at a shorter time than is required for complete transformation of the same, whereupon the product thus obtained is dissolved in a suitable solvent which is heated to such a high temperature and during such a period of time that a complete transformation of the betulin takes place. Said combined method is preferred when the invention is to be carried into practice on large scale, inasmuch as it is possible to use comparatively low temperatures and the product obtained thus becomes more colorless than otherwise. Also in this case temperature and time of heating must be determined empirically.

Having now described my invention what I claim is:

1. The process described of making betulin suitable for the production of coating compositions thereof which consists in heating the betulin to a temperature considerably above its melting point through such a period of time that it does not precipitate from a hot concentrated solution thereof when the latter is cooled, and that it, when the solvent becomes dry or is removed, grows solid and forms a body of a hard, glassy or lac-like structure.

2. The process described of making betulin suitable for the production of coating compositions thereof which consists in heating the betulin in an indifferent gas atmosphere to a temperature considerably above its melting point through such a period of time that it does not precipitate from a hot concentrated solution thereof when the latter is cooled, and that it, when the solvent becomes dry or is removed, grows solid and forms a body of a hard, glassy or lac-like structure.

3. The process described of making betulin suitable for the production of coating compositions thereof which consists in heating the betulin in an indifferent gas atmosphere and at a higher pressure than that of the atmosphere to a temperature considerably above its melting point such a period of time that it does not precipitate from a hot concentrated solution thereof when the latter is cooled, and that it, when the solvent becomes dry or is removed, grows solid and forms a body of a hard, glassy or laclike structure.

4. The process described of making betulin suitable for the production of coating composition thereof which consists in heating the betulin alone to a temperature considerably above its melting point and then heating it together within a suitable solvent at such a temperature through such a period of time that it does not precipitate from a hot concentrated solution thereof and that it, when the solvent becomes dry or is removed, grows solid and forms a body of a hard, glassy or lac-like structure.

In testimony that I claim the foregoing as my invention, I have signed my name in presence of two subscribing witnesses.

JOHAN ROBERT KÖHLER.

Witnesses:
  LUND DELMAY,
  TORVALD NYSTROM.